(12) United States Patent
Massam et al.

(10) Patent No.: US 8,184,748 B2
(45) Date of Patent: May 22, 2012

(54) NARROW BAND RECEIVER

(75) Inventors: Peter David Massam, Saffron Walden (GB); Philip Alan Bowden, Wokingham (GB); Timothy David Howe, Great Shelford (GB); Timothy Jackson, Cambridge (GB)

(73) Assignee: Plextek Limited, Essex (GB)

( * ) Notice: Subject to any disclaimer, the term of this patent is extended or adjusted under 35 U.S.C. 154(b) by 449 days.

(21) Appl. No.: 12/474,814

(22) Filed: May 29, 2009

(65) Prior Publication Data

US 2009/0304127 A1 Dec. 10, 2009

Related U.S. Application Data (63) Continuation of application No. PCT/GB2007/004602, filed on Nov. 30, 2007.

(30) Foreign Application Priority Data

Dec. 1, 2006 (GB) .................................. 0624016.2

(51) Int. Cl.
*H04L 27/06* (2006.01)

(52) U.S. Cl. ......... 375/340; 375/342; 375/350; 375/360

(58) Field of Classification Search .................. 375/340, 375/342, 350, 355, 360
See application file for complete search history.

(56) References Cited

U.S. PATENT DOCUMENTS

| | | | |
|---|---|---|---|
| 5,212,808 A | 5/1993 | Su et al. | |
| 5,500,620 A * | 3/1996 | Brown et al. | ................. 329/300 |
| 6,658,072 B1 | 12/2003 | Asanuma | |
| 6,957,056 B2 * | 10/2005 | Fitzrandolph | ................. 455/323 |
| 2003/0072256 A1 | 4/2003 | Kim | |
| 2003/0186668 A1 * | 10/2003 | Fitzrandolph | ................. 455/313 |
| 2004/0218699 A1 | 11/2004 | Carsello | |
| 2006/0251183 A1 | 11/2006 | Soffer | |

FOREIGN PATENT DOCUMENTS

| | | |
|---|---|---|
| DE | 2756923 A1 | 7/1979 |
| EP | 1032157 A | 8/2000 |
| EP | 1032157 A1 | 8/2000 |
| WO | 9810421 A1 | 3/1998 |
| WO | 0059147 A1 | 10/2000 |

* cited by examiner

*Primary Examiner* — Jean B Corrielus
(74) *Attorney, Agent, or Firm* — BainwoodHuang (57) ABSTRACT

An RF receiver comprises a signal processor arranged to perform a method of decoding data contained within a signal that comprises a set of slots, at least one said slot comprising a preamble portion and a payload portion and being transmitted at a predetermined transmission frequency. The signal processor is arranged to perform a first process to derive timing data from the preamble portion and perform a second process to extract information from the payload portion, the second process being triggered from said timing data derived from the first process. The preamble portion comprises at least a first sequence of data and a second sequence of data, and the second sequence is the inverse of the first sequence. In preferred embodiments the first process comprises identifying a transition between said first and second sequences of data and deriving said timing data from the identified transition.

22 Claims, 7 Drawing Sheets

Figure 1

| P1 | P2 | P3 | P4 | P5 | P6 |
|---|---|---|---|---|---|
| Dotting | Anti-dotting | Synch Word | Payload | Error Correction | Guard period |
| 0-47 | 48 – 63 | 64 – 79 | 80 – 114 | 115 – 191 | 192 – 200 |

Preamble: {P1, P2, P3}

Time slot 1

NARROW BAND RECEIVER

CROSS REFERENCE TO RELATED APPLICATIONS

This patent application is a Continuation of International Patent Application No. PCT/GB2007/004602 filed on Nov. 30, 2007 and entitled "NARROW BAND RECEIVER", the contents and teachings of which are hereby incorporated by reference in their entirety.

FIELD OF THE INVENTION

The present invention relates to a system for and method of digital communications, and is particularly, but not exclusively, suited to decoding data received at low data rates.

BACKGROUND OF THE INVENTION

The majority of point-to-multipoint radio communications systems operate at relatively high bandwidths, due to the high data rates and real-time requirements associated with data receipt and transmission. It would be attractive to operate at low bandwidths for applications having less stringent data rate requirements because of the commensurate advantages in relation to range and reduction in power requirements. However, low bandwidth systems can incur significant frequency lock problems due to the fact that the frequency error between the transmitter and the receiver can be much greater than the signal bandwidth; the identification of the frequency error typically involves use of high accuracy components, which equates to a significant overhead in terms of costs, and to a commensurate limitation in the use of low bandwidth systems.

U.S. Pat. No. 6,522,698 offers a low cost solution in which the bulk of the decoding and processing is performed in the central station, any given remote station simply having to transmit at a relatively low data rate: the remote station (or outstation) is configured so as to generate uplink messages arbitrarily in time, leaving it to the base station to identify the unique signature of any given remote station. Typically this involves providing the base station with many sliding detectors, which are expensive in terms of computational requirements, and, for a large number of remote stations, can become prohibitively costly.

It would be desirable to provide a lower cost narrow band transmission system that is suitable for use with a significant number of remote outstations.

SUMMARY OF THE INVENTION

In accordance with one aspect of the present invention, there is provided a method for use in decoding data contained within a signal, the signal comprising a set of slots, at least one said slot comprising a preamble portion and a payload portion and being transmitted at a predetermined transmission frequency, the method comprising:

performing a first process to derive timing data from the preamble portion; and performing a second process to extract information from the payload portion, the second process being triggered from said timing data derived from the first process, in which the preamble portion comprises at least a first sequence of data and a second sequence of data, the second sequence being the inverse of the first sequence, and in which the first process comprises identifying a transition between said first and second sequences of data and deriving said timing data from the identified transition.

In at least one embodiment of the invention the signal is transmitted from a central station and received by outstations remote therefrom.

In one arrangement the first sequence of data comprises a repeating pattern comprising at least two elements; each of the two elements can be different to the other of the two elements, and the pattern can correspond to a square wave preferably having an equal number of different elements. The second sequence of data can comprise a different number of elements to that of the first sequence, and both sequences are periodic. In a most preferred arrangement the first sequence comprises 24 pairs of {1, 0} "dotting" and the second sequence comprises 8 pairs of {0, 1} "anti-dotting"; it will therefore be appreciated that the first sequence transits abruptly into the second sequences and the transition between sequences can be identified as an interface therebetween.

In one arrangement the second process is triggered during processing of the second sequence so as to enable adequate time for control to switch between the first and second process prior to processing of the payload portion. The slot comprises a further portion comprising a plurality of bits, commonly referred to in the art as a synch word, and the method further comprises performing the second process in respect of the synch word prior to extracting information from the payload portion so as to synchronise the second process with the start of the payload portion.

In preferred arrangements the first process employs a FFT as a set of filter banks, each corresponding to a frequency band; for each data item contained within the preamble portion, the FFT is used to identify a magnitude of signal received within each said frequency band and subtract a first signal magnitude identified for a first said frequency band from a second signal magnitude identified for a second said frequency band, so as to demodulate the signal within at least part of said preamble portion. The first process also involves combining the subtracted signal magnitudes with output from an oscillator such as a complex exponential tuned to a fundamental of a period associated with said first sequence, and accumulating, for example using a leaky integrator, the output of the oscillator over the preamble portion.

In the case where the preamble portion comprises the dotting and anti-dotting sequences mentioned above, the accumulated values increase during the processing of the dotting sequence and abruptly decrease at the start of the processing of the anti-dotting sequence. The phase associated with the output of the leaky integrator at this transition point is then used to derive said timing data because the phase of the leaky integrator output at the transition point is proportional to the relative phase between the complex exponential and the demodulated first sequence, and this relative phase is directly proportional to the bit-timing offset of the outstation.

Thus in embodiments of the invention, the remote station is arranged to derive the timing and frequency information, and can subsequently use the timing data to synchronise itself with the base station; advantageously this synchronisation can be used most effectively when transmitting data to the base station, since if the remote station is synchronised with the base station, this implicitly reduces the amount of processing required to be performed by the base station upon receipt of signals from remote stations. It will be appreciated that when there is a significant number of such remote stations, each transmitting somewhat independently of one another, this significantly relieves the processing requirements on the base station that would otherwise be required with prior art systems such as U.S. Pat. No. 6,522,698.

According to a second aspect of the present invention there is provided a method of identifying frequency data for use in adjusting a frequency offset of a receiver, the method comprising:

receiving a signal at the receiver, the signal comprising a set of slots, at least one said slot comprising a preamble portion and being transmitted at a predetermined transmission frequency, wherein said predetermined frequency is within a known range of frequencies;

dividing the range of frequencies into a plurality of frequency bands;

for each data item contained within the preamble portion:
identifying a magnitude of signal received within each said frequency band;
identifying a plurality of pairs of frequency bands, each said pair of frequency bands comprising a first frequency band and a second frequency band,
for at least some of the plurality of pairs of frequency bands, subtracting a first signal magnitude identified for said first said frequency band from a second signal magnitude identified for said second said frequency band, whereby to demodulate the signal within at least part of said preamble portion;
combining the subtracted signal magnitudes corresponding to respective pairs of frequency bands with output from an oscillator tuned to a fundamental of a period associated with said preamble portion; and
for each pair of first and second said frequency bands, accumulating the combined signal magnitudes over the preamble portion, whereby to identify frequency data for use in adjusting a frequency offset of the receiver.

Preferably the method includes identifying a pair of first and second said frequency bands for which the accumulated signal magnitudes is a maximum, whereby to identify the frequency data. The frequency data is essentially representative of a frequency offset of the receiver in relation to the predetermined frequency of the transmission, i.e. the carrier frequency.

In one arrangement the method includes monitoring changes in said accumulated magnitudes for successive data items within the preamble portion so as to identify a transition point therein; and identifying a phase associated with said transition so as to determine timing data for use in adjusting a bit-timing offset of the receiver.

Most preferably the preamble portion comprises a first sequence and a second sequence, different to the first sequence, and the transition point described above is derivable from the switch between the first and second sequences. A particularly preferred format for the preamble is one in which the first and second sequences are periodic, and in which the second sequence is the inverse of the first sequence.

According to other aspects of the invention there is provided a receiver and parts thereof, adapted to perform the methods described above.

Further features and advantages of the invention will become apparent from the following description of preferred embodiments of the invention, given by way of example only, which is made with reference to the accompanying drawings.

DETAILED DESCRIPTION OF THE INVENTION

The transceivers and communications systems described herein have general application. However, for clarity, the systems and methods are described in the context of remote metering systems such as are used in conjunction with utility meters in a domestic or commercial environment. It is to be understood, however, that the invention is not limited to such applications. For example, the present invention may be applied to low data rate telemetry from remote (e.g. non-mains powered) installations such as water reservoirs; from personal or property accident or attack security alarms such as rape alarms, mountain rescue alarms, etc.; security systems for buildings, low-power wireless alarms, connection of static alarms to a national central monitoring system; remote controls for example in a domestic environment such as for electrical appliance control; remote controls for use in controlling devices such as street lamps; tracking systems for recovering stolen property such as vehicles; and non-radio communications system using, for example, signalling via electricity mains supply. The following description makes mention of various values—in terms of frequency, sampling rates etc.; it is to be appreciated that the particular values are exemplary only and that the invention is not to be limited to any particular individual or combinations of values.

Figure 1:
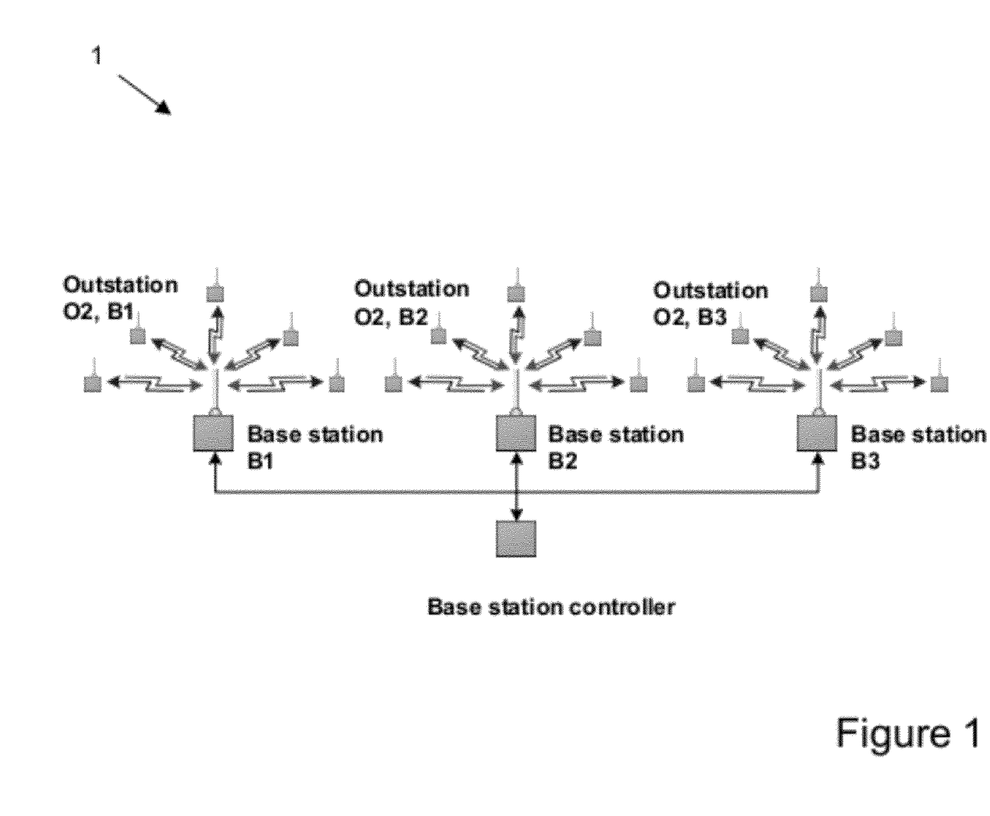
FIG. 1 is a schematic diagram showing an example of a point-multipoint system within which embodiments of the invention can operate.

Referring to FIG. 1, in one arrangement, the communications system 1 comprises a set of base stations B1 ... Bn, each base station Bi being capable of communicating with a set of outstations $O1_{Bi}$ ... $On_{Bi}$ (where i and n are index identifiers indicating that any given base station $B_i$ has n outstations associated therewith). Each of the base stations and outstations is capable of duplex communications and the base stations transmit data according to a frame structure. The transmission includes elements that are relevant to all outstations and elements that are specifically for one outstation. Time Division Duplex (TDD) is used to multiplex the messages onto a single carrier, and the modulation employed is 500 bits per second (bps) continuous-phase Frequency Shift Keyed (FSK) with ±250 Hz deviation. Whilst not essential, in some arrangements (e.g. when the communications system 1 is used in the USA) the base stations use frequency hopping as mandated by the Federal Bureau of Communications (FCC), which involves changing the transmit frequency every 0.4 seconds. The format of a given frame will be described in detail below, but suffice to say that the corollary of this frequency hopping condition is that any given time slot within a frame has a duration of 0.4 seconds; thus for a bit transmission rate of 500 bps any given time slot can contain up to 200 bits of data.

Figure 2:
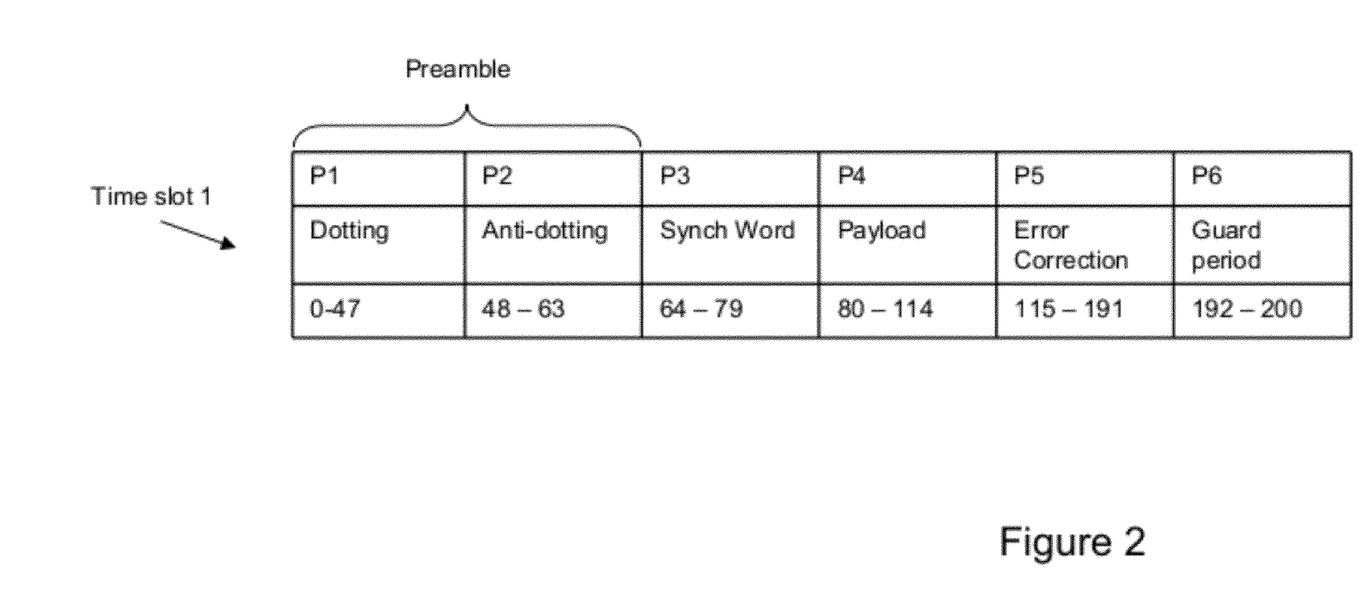
FIG. 2 is a schematic diagram showing portions of a first time slot of a given frame according to embodiments of the invention.

A first aspect of the invention is concerned with the functionality of the outstations, specifically the receiver parts thereof, and the functionality of the receiver will be described with reference to FIGS. 3-7 in the context of the preamble of a frame according to an embodiment of the invention. As is well known in the art, the preamble always appears at the beginning of the transmission and occupies the start of every frame; thus detection of a preamble in a base station's transmission is the first stage in demodulation of the transmissions from the base station. Referring to FIG. 2, in embodiments of the invention the preamble comprises two sequences of data P1, P2, the second sequence P2 being the inverse of at least part of the first sequence P1. The remainder of the time slot 1 comprises a synch word portion P3, a payload portion P4, an error correction period P5 and a guard period P6 (the last being relevant in frequency hopping systems).

In one arrangement the first and second sequences P1, P2 are periodic; for example the first sequence can comprise a so-called dotting sequence {0, 1, 0, 1 . . . } and the second sequence can comprise a so-called anti-dotting sequence {1, 0, 1, 0 . . . }. Embodiments of the invention are not constrained to any particular format for the sequences, other than that sequences should contain a pattern that repeats within the sequence, and comprises a non-prime number of elements (the dotting/anti-dotting sequence comprises a repeating pattern of two elements (0, 1) and (1, 0) respectively). Preferably the pattern comprises an arbitrary sequence of bits and the second sequence can comprise a different number of repetitions to that included in the first sequence. In a most preferred arrangement the first sequence P1 comprises 24 pairs of dotting and the second sequence P2 comprises 8 pairs of anti-dotting.

The significance of the various portions P1 . . . P6 in relation to aspects of the receiver will now be described with reference to FIGS. 3-5. In overview, the receiver 10 comprises an analogue receiver part 3 and a signal processor 5, and in one embodiment the analogue receiver part 3 comprises a down converter 7, which converts the carrier frequency of the received data signal to an intermediate frequency (IF) of approximately 8 kHz. The quadrature IF signals are sampled by an Analogue to Digital Converter 9 (ADC), which generates, as output, complex 2×12-bit samples at 32 ksps having an effective noise bandwidth of 20 kHz; the output of the ADC 9 is fed into the signal processor 5.

As described above, embodiments of the invention transmit and receive at low data rates so as to keep power requirements to a minimum yet be able to transceive data over long distances. In the following, it is assumed that the outstation has identified the nominal carrier frequency associated with the time slot, though not the actual value of the carrier frequency as it appears to the oscillator local to the outstation; there is therefore an as yet undetermined frequency error between the base station and the outstation (that is to say the difference between the value of the frequency at which signals are transmitted and the value that such frequencies appear to be to the outstation). As described in the background section this frequency error can be greater than the signal bandwidth, since this is, by definition, small.

Figure 3:
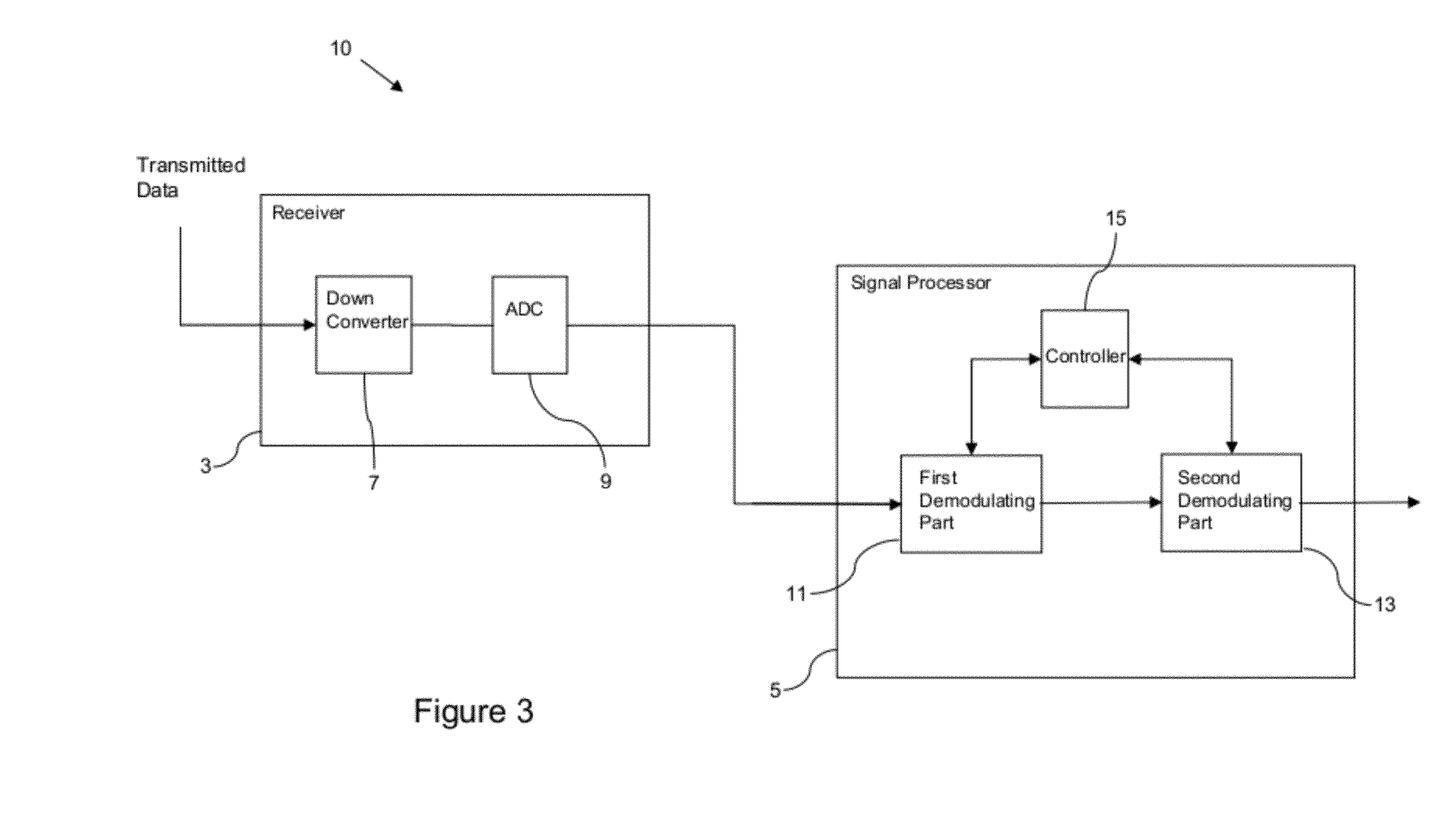
FIG. 3 is a schematic diagram showing components of a receiver utilised by an outstation shown in FIG. 1.
Figure 4:
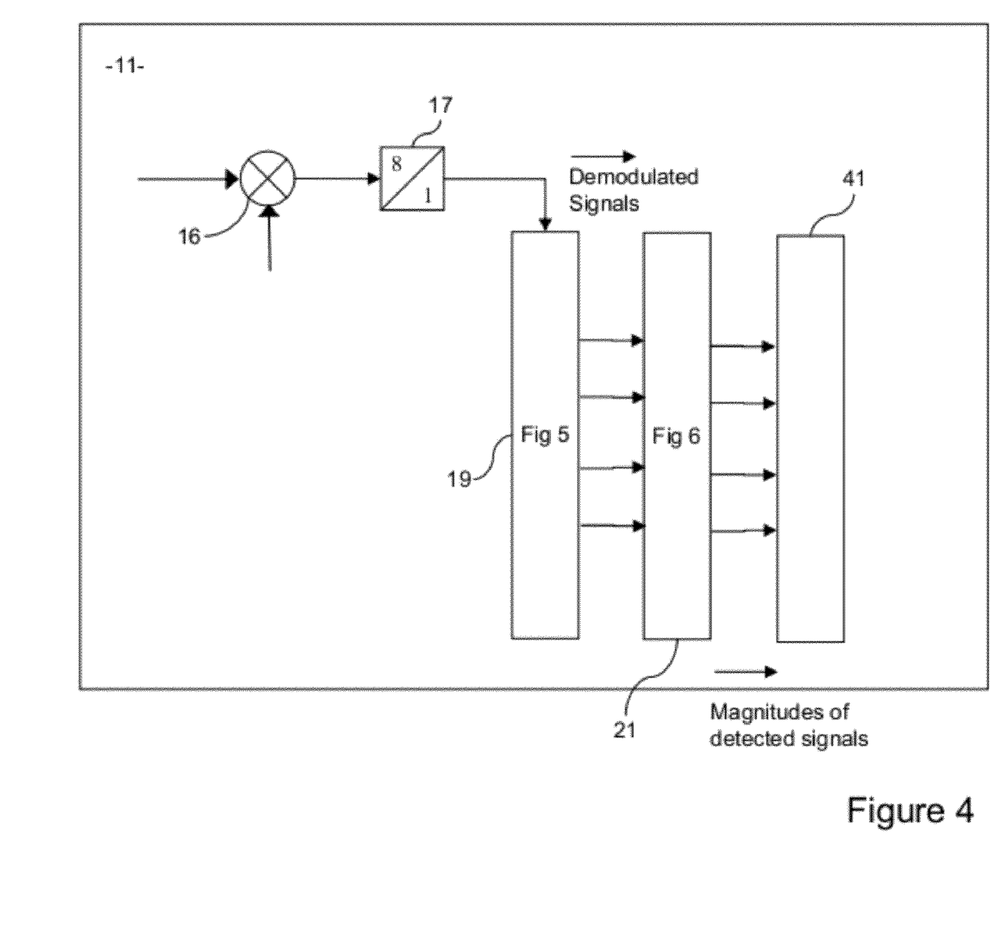
FIG. 4 is a schematic block diagram showing components of the signal processor of FIG. 3.

In order to be able to successfully demodulate the signal in a narrow noise bandwidth (which is essential for long range) it is necessary to remove the frequency error. In embodiments of the invention this is done by means of a Fast Fourier Transform (FFT) which, with reference to FIG. 3, is implemented within a first demodulating part 11 of the signal processor 5 and essentially acts as a bank of filters spaced based around the outstation's version of the carrier frequency. As shown in FIG. 4, in addition to an FFT 19, the first demodulating part 11 also comprises a narrowband detector element 21, which serves to identify bit timing associated with the preamble, as will be described in more detail below.

Returning to FIGS. 2 and 3, once the frequency error and bit timing have been identified, control of demodulation of data contained within the time slot 1 is transferred to the second demodulating part 13. As will be explained in detail below, this typically occurs towards the end of the second sequence P2 of the preamble, at the frequency derived from the FFT 19; the second demodulating part 13 is then used to decode the third portion P3 of the time slot 1 on the basis of the bit timing derived from the first demodulating part 11 so as to ensure that demodulation of the payload portion P4 occurs precisely at the start of the payload portion P4, and thus that all of the data transmitted from the base station is recovered by the outstation. This latter process is referred to as packet timing recovery, and essentially ensures accurate and reproducible alignment of the payload data with the bit timing. The second demodulating part 13 can have a far narrower bandwidth than that of the first demodulating part 11, since the frequency error associated with the transmitted data has previously been identified by the FFT 19.

Thus in overview, the preamble portion P1, P2 is used to identify frequency error and bit timing, which are used to control the configuration and triggering of the second demodulating part 13; this in turn enables the outstation to synchronise processing of the payload data with the start of the payload portion P4 by means of a narrow band demodulator.

The details of these various parts and processes will now be described in detail, starting with the first demodulating part 11 and referring firstly to FIG. 4. In one arrangement the first demodulating part 11 comprises a first mixer 16 for mixing the received samples to base-band, and means 17 for decimating the mixed signal so as to modify the rate at which data are introduced to the FFT 19; the first mixer 16 multiplies the ADC samples received from the analogue receiver part 3 by a complex exponential tuned to the nominal IF (8 kHz) and the decimation applied by part 17 results in a baseband signal nominally centred at 0 Hz and sampled at 4 kHz. The first mixer 16 is preferably in operative association with an anti-aliasing filter (not shown) acting as a low-pass filter. As a result of the decimation, therefore, samples are introduced into the FFT at a rate of 4 kHz; in a preferred arrangement the bin resolution of the FFT is chosen to be 62.5 Hz, meaning that the FFT 19 comprises a 64 point FFT (4000/62.5), as indicated in FIG. 5.

Figure 5:
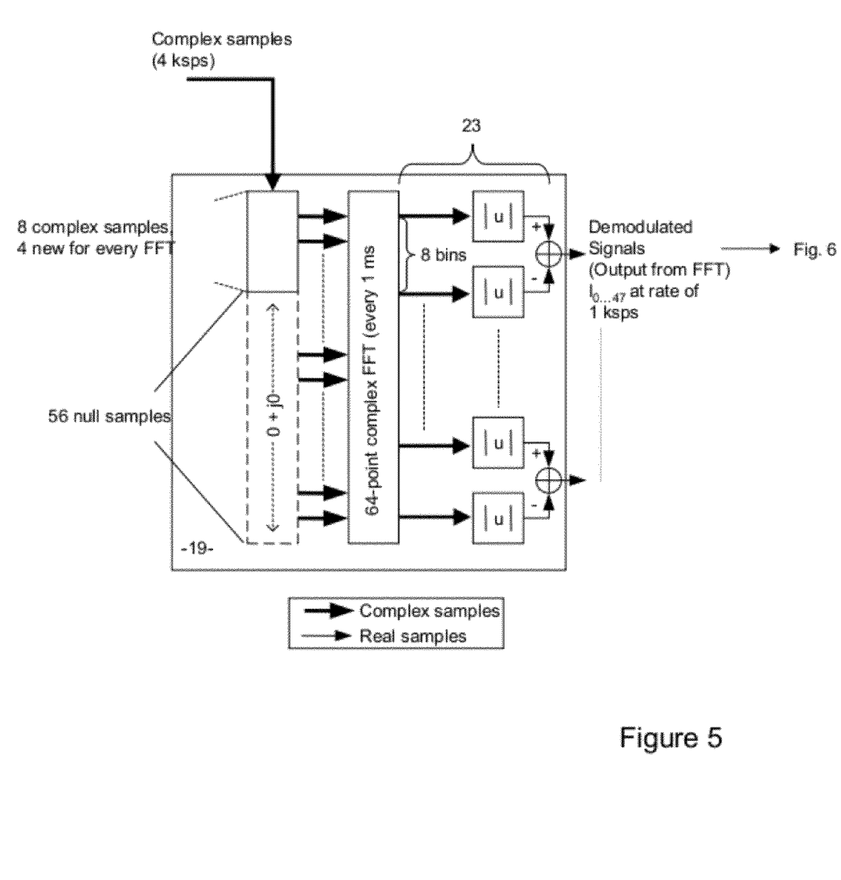
FIG. 5 is a schematic block diagram showing components of an FFT-based parallel demodulator forming part of the receiver of FIG. 4.

The FFT 19 is preferably a FFT-based parallel demodulator which performs FFT calculations every 1 ms, so that for an input rate of 4 kHz, 4 new samples are added for each iteration of the FFT and the FFT bins span ±2 kHz, which means that for a data rate of 500 bps (i.e. a bit period of 2 ms) there will be 2 FFT results in every bit period. Demodulation of the preamble is effected by taking the difference in magnitude between pairs of bins separated by twice $$\text{the frequency deviation} = \frac{2 \times 250}{62.5} = 8 \text{ bins;}$$

this is indicated by portion 23 in FIG. 5. This is quite different to methods such as that described in U.S. Pat. No. 6,522,698, in which demodulation is performed as a separate process to that of frequency identification (in addition to being performed at the base station as opposed to in the outstations).

In FIG. 5 the input samples are indicated as being complex samples; for such arrangements bins 32 to 63 correspond to negative frequencies, which means that the ordering of the bins has to be re-ordered in accordance with ascending order of frequency prior to evaluating the difference between respective pairs of separated bins. The output of the FFT 19 is a set of 56 demodulated frequency offsets, and typically a subset of the set (e.g. the central 52 or 50 or 47; preferably 47, indicated by $I_{0 \ldots 47}$) is selected for input to the narrowband detector 21.

Figure 6:
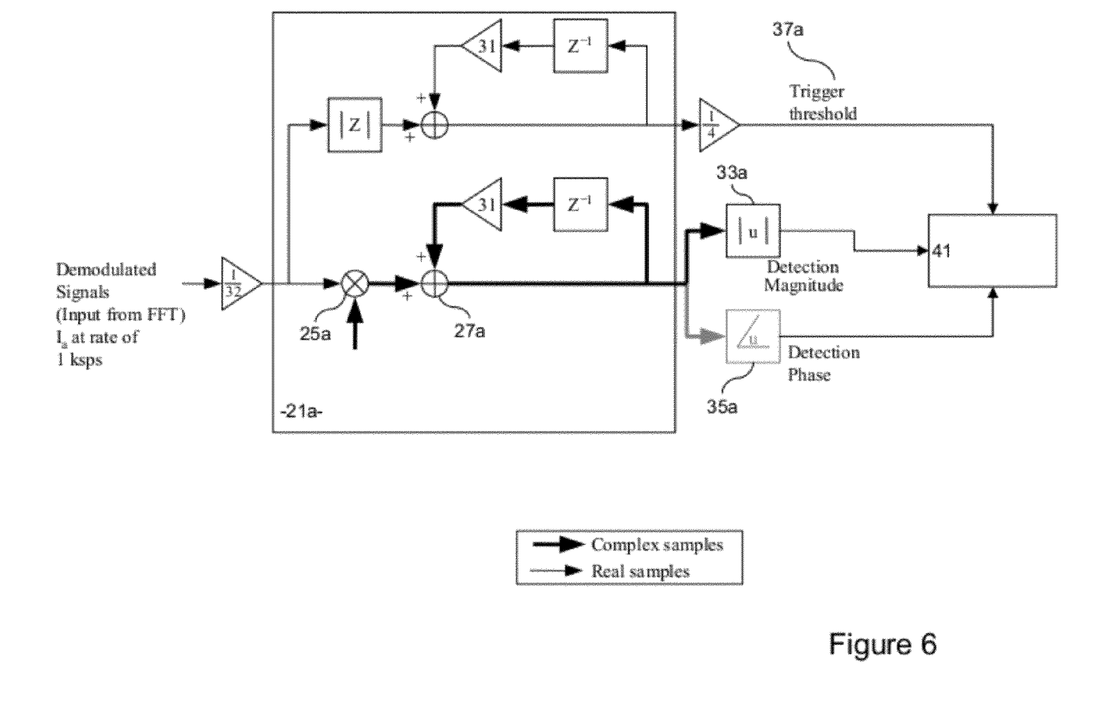
FIG. 6 is a schematic block diagram showing components of a narrowband detector of FIG. 4.

In view of the fact that the preamble portion utilises a sequence comprising a well defined pattern, the narrowband detector 21 can be designed to take advantage of the properties of the first sequence; with respect to the preferred embodiment, in which the first sequence comprises a periodic dotting pattern having a bit rate of 500 bps, the fundamental component that is output from the FFT 19 is precisely located at half the bit rate (i.e. 250 Hz). Since the fundamental component can be precisely located, a complex exponential can be mixed with the output of the FFT 19 so as to identify the frequency error associated with the outstation. Accordingly, in one embodiment the narrowband detector 21 comprises a plurality of detector elements 210 . . . 2147 (only one, 21*a*, is shown in FIG. 6), each of which receives one of the (47) demodulated inputs $I_a$ from the FFT 19, and mixes the input with an mixer 25*a* in order to mix the fundamental of the periodic pattern associated with sequences P1, P2 down to 0 Hz. The output of the mixer 25*a* is then low-pass filtered by means of a leaky integrator 27*a* (e.g. an impulse response filter), which essentially sums the magnitude of successively received inputs from the FFT 19. A leaky integrator (as opposed to other filter types) is preferable for the low-pass filter because it provides a convenient mechanism for adjusting the bandwidth without affecting processing or memory requirements.

Figure 7:
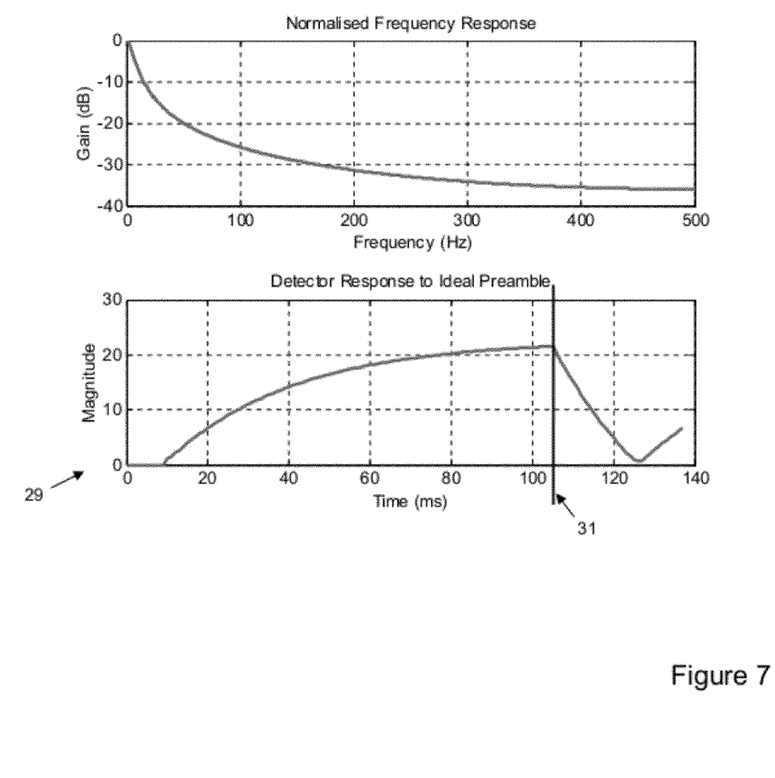
FIG. 7 is a graphical representation of output of a leaky integrator component shown in FIG. 6.

FIG. 7 shows the frequency response 29 of the leaky integrator 27*a* and the time response of the detector to successively received parts of an ideal preamble signal. The relatively sharp decay 31 of the response 29 results from the anti-dotting sequence P2 of the preamble portion, and, because the transition, or changeover, from the dotting sequence P1 to the anti-dotting sequence P2 occurs within a single bit, it is this part of the response that enables bit timing to be identified from the preamble.

Turning back to FIG. 6, each narrowband detector element 21*a* also comprises means 33*a*, 35*a* for calculating the mean magnitude and phase of the input $I_a$ received from the FFT 19, and the magnitude values are input to an algorithm 41 for determining whether or not the input $I_a$ received from the FFT 19 corresponds to a preamble (rather than noise). Various mechanisms can be utilised to implement the trigger criteria, and in fact the roll-off associated with various other parts of the receiver 10 means that there is no single value that is appropriate for all of the inputs received from the FFT 19; instead the trigger threshold that is appropriate for a given input $I_a$ from the FFT 19 is selected and input to the algorithm 41, modified (where appropriate) to account for local interference, as indicated as part 37*a* in FIG. 6.

In one arrangement, the algorithm 41 compares the mean magnitude received from each narrowband detector 210 . . . 47 against its respective threshold value, and in the event that the magnitude for that output exceeds the threshold value for more than a specified period of time, the receiver 10 enters into a "triggered" state in respect of the narrowband detector element $21_i$ under examination. Having reviewed the set of magnitude outputs from all of the narrowband detector elements 210 . . . 47, the algorithm 41 identifies the output having the largest magnitude, and this is used to define a new threshold, $Th_{detect}$. This new threshold is applied to the output of all of the narrowband detector elements 210 . . . 47 and the process repeated until the signal level in a "triggered" narrowband detector element $21_i$ drops below the threshold: this point is deemed indicative of transition point 31 shown in FIG. 7.

Various timeout-related conditions can also be applied in order to eliminate false detections, and the skilled person would be able to design appropriate controls to mitigate these.

Returning back to FIG. 3, the output of the first demodulating part 11, which comprises successively generated magnitude information identified by the algorithm 41, is input to a controller 15. The controller 15 can be used to identify both the frequency error and the bit timing on the basis of the outputs from the narrowband detector elements 210 . . . 47 and the algorithm 41 (as described above and based on FIG. 7); once these have been determined, the controller 15 can take advantage of the known frequency error and switch control to what is essentially a single channel decoder (and which has a far narrower bandwidth than the 4 kHz used by the FFT 19) to perform demodulation of the synch word portion P3 and the payload portion P4.

The synch word portion P3 is included within the time slot 1 to alleviate timing errors incurred due to the switching over to the second modulating part 13 (this switch effectively impairing the precise bit timing previously identified from the boundary between the first and second sequences P1, P2). Since the synch word portion P3 has a predetermined format, demodulating this portion P3 by means of the single channel decoder 13 and correlating the demodulated data against the known format of the portion P3, enables the second demodulating part 13 to regain any loss of timing that may have been lost by the switch between demodulating parts 11, 13; as a result, by the time that processing of the payload portion 14 is due to commence, the single channel decoder 13 is synchronised and can commence processing.

In fact, the controller 15 can trigger operation of the single channel decoder (second demodulating part 13) as soon as the bit timing has been identified from the leaky integrator 27 and thus during the second sequence P2 of the preamble portion. However, it will be appreciated that timing synchronisation of the single channel decoder 13 has to be performed on the basis of some sort of unique data pattern (and not on the basis of the second sequence P2 alone, since that is a repeating pattern with no distinguishing features and once precise alignment with specific bits in the sequence has been lost (which is inevitable when switching between demodulating parts 11, 13), it is impossible to regain this on the basis of the repeating sequence alone).

The single channel decoder 13 can be embodied using standard demodulation methods such as standard methods such as a matched-filter demodulator. The decoder 13 performs the sampling at a rate of one sample per bit (thus at 500 samples per second) at the "middle of the eye" (as is known in the art, analogue waveforms can be represented as a timing "eye diagram", which is a visual guide used to help assess signal quality. As the noise levels increase, the 'eye closes', so the regions where the eye appears to be closed are preferably avoided). In embodiments in which the preamble portion P1, P2 utilises a sequence of dotting and anti-dotting, the optimum point to sample the data stream can be identified relatively easily, for example from the phase output 35*a* of the narrowband detector elements 210 . . . 47 or real/imaginary peak values of the leaky integrator 27*a*.

The above embodiments are to be understood as illustrative examples of the invention. Further embodiments of the invention are envisaged. For example, the first and second sequences P1, P2 could be embodied as a dotting sequence based on the 1100 pattern, which would make the FFT 19 more resistant to noise, but at the cost of requiring longer sequences. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for use in decoding data contained within a signal, the signal comprising a set of slots, at least one of said slots comprising a preamble portion and a payload and/or synchronisation word portion and being transmitted at a predetermined transmission frequency, the preamble portion comprising at least a first sequence of data and a second sequence of data, the second sequence being the inverse of the first sequence, the method comprising:
performing a first process to derive timing data and to identify a transition between said first and second sequences of data from the preamble portion; and
performing a second process to extract information from the payload and/or synchronisation word portion using said timing data, the second process being triggered on the basis of the identification of the transition by the first process,
in which the first process comprises:
performing an accumulation on a filtered component of the preamble portion;
identifying the transition point between said first and second sequences of data on the basis of the accumulation; and
deriving said timing data on the basis of a phase associated with demodulation of at least part of said preamble portion.

2. A method according to claim 1, in which the first sequence of data comprises a repeating pattern comprising at least two elements.

3. A method according to claim 2, in which each of the two elements is different to the other of the two elements.

4. A method according to claim 2, in which the first repeating pattern comprises an equal number of different elements.

5. A method according to claim 1, in which the second sequence of data comprises a different number of elements to that of the first sequence.

6. A method according to claim 1, in which the first sequence of data is a periodic sequence.

7. A method according to claim 1, in which the first and second sequences correspond to a square wave.

8. A method according to claim 1, in which the first sequence comprises a pattern comprising {0, 1}, the pattern being repeated twenty four times within the first sequence.

9. A method according to claim 8, in which the second sequence comprises a pattern comprising {1, 0}, the pattern being repeated eight times within the second sequence.

10. A method according to claim 1, in which the second process is triggered during processing of the second sequence.

11. A method according to claim 1, in which said at least one of said slots comprises a further portion comprising a plurality of bits, and the method further comprises performing the second process in respect of the further portion prior to extracting information from the payload portion so as to synchronise the second process with the start of the payload portion.

12. A method according to claim 1, in which the predetermined frequency lies within a known range of frequencies, and the first process comprises:
dividing the range of frequencies into a plurality of frequency bands;
for each data item contained within the preamble portion:
identifying a magnitude of signal received within each said frequency band;
identifying a plurality of pairs of frequency bands, each of said pairs of frequency bands comprising a first frequency band and a second frequency band,
for at least some of the plurality of pairs of frequency bands, subtracting a first signal magnitude identified for said first frequency band from a second signal magnitude identified for said second frequency band, whereby to demodulate the signal within at least part of said preamble portion;
combining the subtracted signal magnitudes corresponding to respective pairs of frequency bands with output from an oscillator tuned to a fundamental of a period associated with said preamble portion; and
for each pair of first and second said frequency bands, accumulating the combined signal magnitudes over the preamble portion, whereby to determine changes therein and thence said timing data.

13. A method according to claim 12, including
monitoring changes in said accumulated magnitudes for successive data items within the preamble portion so as to identify said transition between said first and said second sequences of data; and
identifying a phase associated with said transition so as to determine said timing data.

14. A method of identifying frequency data for use in adjusting a frequency offset of a receiver, the method comprising:
receiving a signal at the receiver, the signal comprising a set of slots, at least one of said slots comprising a preamble portion and being transmitted at a predetermined transmission frequency, wherein said predetermined frequency is within a known range of frequencies;
dividing the range of frequencies into a plurality of frequency bands;
for each data item contained within the preamble portion:
identifying a magnitude of signal received within each said frequency band;
identifying a plurality of pairs of frequency bands, each of said pairs of frequency bands comprising a first frequency band and a second frequency band,
for at least some of the plurality of pairs of frequency bands, subtracting a first signal magnitude identified for said first frequency band from a second signal magnitude identified for said second frequency band, whereby to demodulate the signal within at least part of said preamble portion;
combining the subtracted signal magnitudes corresponding to respective pairs of frequency bands with output from an oscillator tuned to a fundamental of a period associated with said preamble portion; and
for each pair of first and second said frequency bands, accumulating the combined signal magnitudes over the preamble portion, whereby to identify frequency data for use in adjusting a frequency offset of the receiver.

15. A method according to claim 14, further comprising identifying a pair of first and second said frequency bands for which the accumulated signal magnitudes is a maximum, whereby to identify the frequency data.

16. A method according to claim 15, including monitoring changes in said
   accumulated magnitudes for successive data items within the preamble portion so as to identify a transition point therein; and
   identifying a phase associated with said transition so as to determine timing data for use in adjusting a bit-timing offset of the receiver.

17. A method according to claim 16, in which the preamble portion comprises a first sequence and a second sequence, the second sequence being the inverse of the first sequence.

18. A method according to claim 17, including monitoring changes in said accumulated magnitudes for successive data items within the preamble portion so as to identify an interface between said first and said second sequences of data, whereby to identify said transition point.

19. A signal processor for use in a narrow band receiver, the signal processor being for decoding data contained within a signal, the signal comprising a set of slots, at least one of said slots comprising a preamble portion and a payload and/or synchronisation word portion and being transmitted at a predetermined transmission frequency, the preamble portion comprising at least a first sequence of data and a second sequence of data, the second sequence being the inverse of the first sequence, the signal processor comprising a first demodulating part and a second demodulating part, the first demodulating part being arranged to:
   perform a first process to derive timing data and to identify a transition between said first and second sequences of data from the preamble portion; and the second demodulating part being arranged to:
   perform a second process to extract information from the payload and/or synchronisation word portion using said timing data, the second process being triggered on the basis of the identification of the transition by the first process,
   in which, when executing the first process, the first demodulating part is arranged to:
   perform an accumulation on a filtered component of the preamble portion;
   identify the transition point between said first sequence and second sequence of data on the basis of the accumulation; and
   derive said timing data on the basis of a phase associated with demodulation of at least part of said preamble portion.

20. A signal processor according to claim 19, in which said at least one of said slots comprises a further portion comprising a plurality of bits, and the second demodulating part is arranged to perform the second process in respect of the further portion prior to extracting information from the payload portion so as to synchronise the second process with the start of the payload portion.

21. A signal processor according to claim 19, wherein the first demodulating part comprising:
   a digital filter arranged to divide the range of frequencies into a plurality of frequency bands, wherein, for each data item contained within the preamble portion, the filter is arranged to identify a magnitude of signal received within each said frequency band and identify a plurality of pairs of frequency bands, each of said pairs of frequency bands comprising a first frequency band and a second frequency band, the filter being arranged, for at least some of the plurality of pairs of frequency bands, to subtract a first signal magnitude identified for said first frequency band from a second signal magnitude identified for said second frequency band, whereby to demodulate the signal within at least part of said preamble portion; and
   a detector element arranged to combine the subtracted signal magnitudes corresponding to respective pairs of frequency bands with output from an oscillator tuned to a fundamental of a period associated with said preamble portion, wherein, for each pair of first and second said frequency bands, the detector element is arranged to accumulate the combined signal magnitudes over the preamble portion, whereby to identify said transition between the first sequence and second sequence.

22. A receiver for identifying frequency data for use in adjusting a frequency offset of said receiver, the receiver comprising:
   an antenna for receiving a signal, the signal comprising a set of slots, at least one of said slots comprising a preamble portion and being transmitted at a predetermined transmission frequency, wherein said predetermined frequency is within a known range of frequencies;
   a digital filter arranged to divide the range of frequencies into a plurality of frequency bands, wherein, for each data item contained within the preamble portion, the filter is arranged to identify a magnitude of signal received within each said frequency band and identify a plurality of pairs of frequency bands, each said pair of frequency bands comprising a first frequency band and a second frequency band, the filter being arranged, for at least some of the plurality of pairs of frequency bands, to subtract a first signal magnitude identified for said first frequency band from a second signal magnitude identified for said second frequency band, whereby to demodulate the signal within at least part of said preamble portion; and
   a detector element arranged to combine the subtracted signal magnitudes corresponding to respective pairs of frequency bands with output from an oscillator tuned to a fundamental of a period associated with said preamble portion, wherein, for each pair of first and second said frequency bands, the detector element is arranged to accumulate the combined signal magnitudes over the preamble portion, whereby to identify frequency data for use in adjusting a frequency offset of the receiver.

* * * * *